UNITED STATES PATENT OFFICE.

WALTER E. MASLAND, OF WILMINGTON, DELAWARE, ASSIGNOR TO E. I. DU PONT DE NEMOURS POWDER COMPANY, OF WILMINGTON, DELAWARE, A CORPORATION OF NEW JERSEY.

PRODUCTION OF SOLVENTS BY USE OF HALOGEN COMPOUNDS.

1,082,543.  Specification of Letters Patent.  Patented Dec. 30, 1913.

No Drawing.  Application filed October 7, 1912.  Serial No. 724,440.

*To all whom it may concern:*

Be it known that I, WALTER E. MASLAND, of Wilmington, in the county of Newcastle, and in the State of Delaware, have invented a certain new and useful Improvement in Production of Solvents by use of Halogen Compounds, and do hereby declare that the following is a full, clear, and exact description thereof.

My invention relates particularly to the production of a new solvent or solvent mixture, which may be used in many different industries, but which is especially applicable to the production of nitrocellulose coatings, lacquer, artificial leather, bronzing liquors, patent leather, varnishes, etc.

As a concrete embodiment of my invention, I will describe it as applied to pyroxylin coatings. In producing solvents of this character, it is desirable to provide a solvent or solvent mixture which is non-hygroscopic and a part of which has a low boiling point and evaporates rapidly, while another portion thereof has a high boiling point and will therefore evaporate slowly and make the resulting coating hard and tough. Refined fusel oil has been used for the purpose of rendering miscible different solvent liquids of the above character such as alcohol and benzin, which would otherwise be immiscible, and in order to effect this end it has, for example, been customary to add at least approximately three parts of refined fusel oil to a mixture of fifty parts of wood alcohol and fifty parts 61° Bé. benzin. Refined fusel oil is, however, very expensive.

I have discovered that the halogen derivatives of organic compounds, and especially of the hydrocarbons such, for example, as chlorolefins, may be used in the place of fusel oil in producing solvent mixtures. Chlorolefins are much preferable to fusel oil in solvent mixtures. The chlorolefins are cheap and may be obtained in large quantities often as by-products in other processes. Furthermore, they are non-hygroscopic and insoluble in water. They evaporate more quickly even than amyl acetate, but do not evaporate so quickly as to render their use disadvantageous in solvents. They are not in themselves solvents of nitrocellulose, but they may be added to solvents thereof without precipitating the nitrocellulose. They are, furthermore, miscible with practically all organic solvents and therefore act effectively to render miscible those liquids which are in themselves immiscible.

As one illustrative embodiment of the use of chlorolefins in accordance with my invention, I may make use of a chlorolefin fraction boiling between about 75° C. and 130° C. This may be used to render miscible a mixture of fifty parts of wood alcohol and fifty parts of benzin by adding at least six parts of the chlorolefins thereto, and the whole may be used as a solvent of nitrocellulose containing any other ingredients to produce the desired coating composition.

While I have described my invention above in detail, I wish it to be understood that many changes may be made therein without departing from the spirit thereof.

I claim:

1. A composition comprising an unsaturated chlorhydrocarbon mixed with and rendering miscible a plurality of normally immiscible liquids.

2. A composition comprising an unsaturated chlorhydrocarbon mixed with and rendering miscible a plurality of normally immiscible liquids, comprising wood alcohol and benzin.

3. A composition comprising a halogen derivative of a hydrocarbon mixed with and rendering miscible a plurality of normally immiscible liquids, comprising wood alcohol, benzin and nitrocellulose dissolved therein.

4. A composition comprising a chlorhydrocarbon mixed with and rendering miscible a plurality of normally immiscible liquids, comprising wood alcohol, benzin and nitrocellulose dissolved therein.

5. A composition comprising an unsaturated chlorhydrocarbon mixed with and rendering miscible a plurality of normally immiscible liquids, comprising wood alcohol, benzin and nitrocellulose dissolved therein.

6. A composition comprising a chlorolefin mixed with and rendering miscible a plurality of normally immiscible liquids.

7. A composition comprising a chlorolefin mixed with and rendering miscible a plurality of normally immiscible liquids, comprising wood alcohol and benzin.

8. A composition comprising a chlorolefin mixed with and rendering miscible a plurality of normally immiscible liquids, comprising wood alcohol, benzin and nitrocellulose dissolved therein.

9. A compostion comprising an aliphatic monochlorhydrocarbon mixed with and rendering miscible a plurality of normally immiscible liquids.

10. A composition comprising an aliphatic monochlorhydrocarbon mixed with and rendering miscible a plurality of normally immiscible liquids, comprising wood alcohol and benzin.

11. The process which comprises rendering a plurality of immiscible liquids miscible by adding thereto an aliphatic monochlorhydrocarbon.

12. A composition comprising an unsaturated halogen derivative of a hydrocarbon mixed with and rendering miscible a plurality of normally immiscible liquids.

13. A composition comprising a halogen substitution derivative of an olefin mixed with and rendering miscible a plurality of normally immiscible liquids.

14. A composition comprising a monohalogen derivative of an aliphatic hydrocarbon mixed with and rendering miscible a plurality of normally immiscible liquids.

15. A composition comprising an unsaturated chlorhydrocarbon mixed with and rendering miscible a plurality of normally immiscible liquids and a nitrated carbo-hydrate dissolved therein.

16. A composition comprising a chlorolefin mixed with and rendering miscible a plurality of normally immiscible liquids and a nitrated carbo-hydrate dissolved therein.

17. A composition comprising an aliphatic mono-chlorhydrocarbon mixed with and rendering miscible a plurality of normally immiscible liquids and a nitrated carbo-hydrate dissolved therein.

18. A composition comprising an unsaturated halogen derivative of a hydrocarbon mixed with and rendering miscible a plurality of normally immiscible liquids and a nitrated carbo-hydrate dissolved therein.

19. A composition comprising a halogen substitution derivative of an olefin mixed with and rendering miscible a pluraltiy of normally immiscible liquids and a nitrated carbo-hydrate dissolved therein.

20. A composition comprising a monohalogen derivative of an aliphatic hydrocarbon mixed with and rendering miscible a plurality of normally immiscible liquids and a nitrated carbo-hydrate dissolved therein.

21. A composition comprising a halogen derivative of an unsaturated hydrocarbon mixed with and rendering miscible a plurality of normally immiscible liquids.

22. A composition comprising a halogen derivative of an unsaturated hydrocarbon mixed with and rendering miscible a plurality of normally immiscible liquids, and a nitrated carbo-hydrate dissolved therein.

In testimony that I claim the foregoing I have hereunto set hand

WALTER E. MASLAND.

Witnesses:
C. R. MUDGE,
A. M. GORMAN.